United States Patent [19]

Acar

[11] 4,319,734
[45] Mar. 16, 1982

[54] VALVE

[75] Inventor: Ali Acar, Los Angeles, Calif.

[73] Assignee: International Telephone and Telegraph Corporation, New York, N.Y.

[21] Appl. No.: 241,724

[22] Filed: Mar. 9, 1981

[51] Int. Cl.³ .............................................. F16K 25/00
[52] U.S. Cl. ..................................... 251/174; 251/315
[58] Field of Search ................................. 251/315, 174

[56] References Cited

U.S. PATENT DOCUMENTS

| | | | |
|---|---|---|---|
| 3,118,649 | 1/1964 | Allen et al. | 251/315 |
| 3,164,362 | 1/1965 | Lavigueur | 251/315 |
| 3,269,691 | 8/1966 | Meima et al. | 251/174 |
| 3,521,855 | 7/1970 | Jensen | 251/315 |
| 3,916,940 | 11/1975 | Allen | 251/315 |
| 4,071,220 | 1/1978 | Iino | 251/315 |
| 4,137,936 | 2/1979 | Sekimoto | 251/315 |

Primary Examiner—H. Jay Spiegel
Attorney, Agent, or Firm—A. Donald Stolzy

[57] ABSTRACT

A ball valve having a cylinder slidable in a port. The cylinder has a lip which is pressed, by a spring, against a spherical surface surrounding a passage through the ball. A sleeve is slidable to a position over the cylinder, the sleeve having an annular groove adjacent the lip and a first seal therein. The sleeve has a portion contiguous to the cylinder at the end thereof opposite the lip, a second seal being provided between the housing and the sleeve portion. If C is the inside diameter of the lip, if B is the outside diameter of the length of the cylinder having the groove, if A is the outside diameter of the sleeve portion, if A>C, and if C>B, the valve will seal for flow in either direction or for zero flow all at, say, 3000 psi.

1 Claim, 3 Drawing Figures

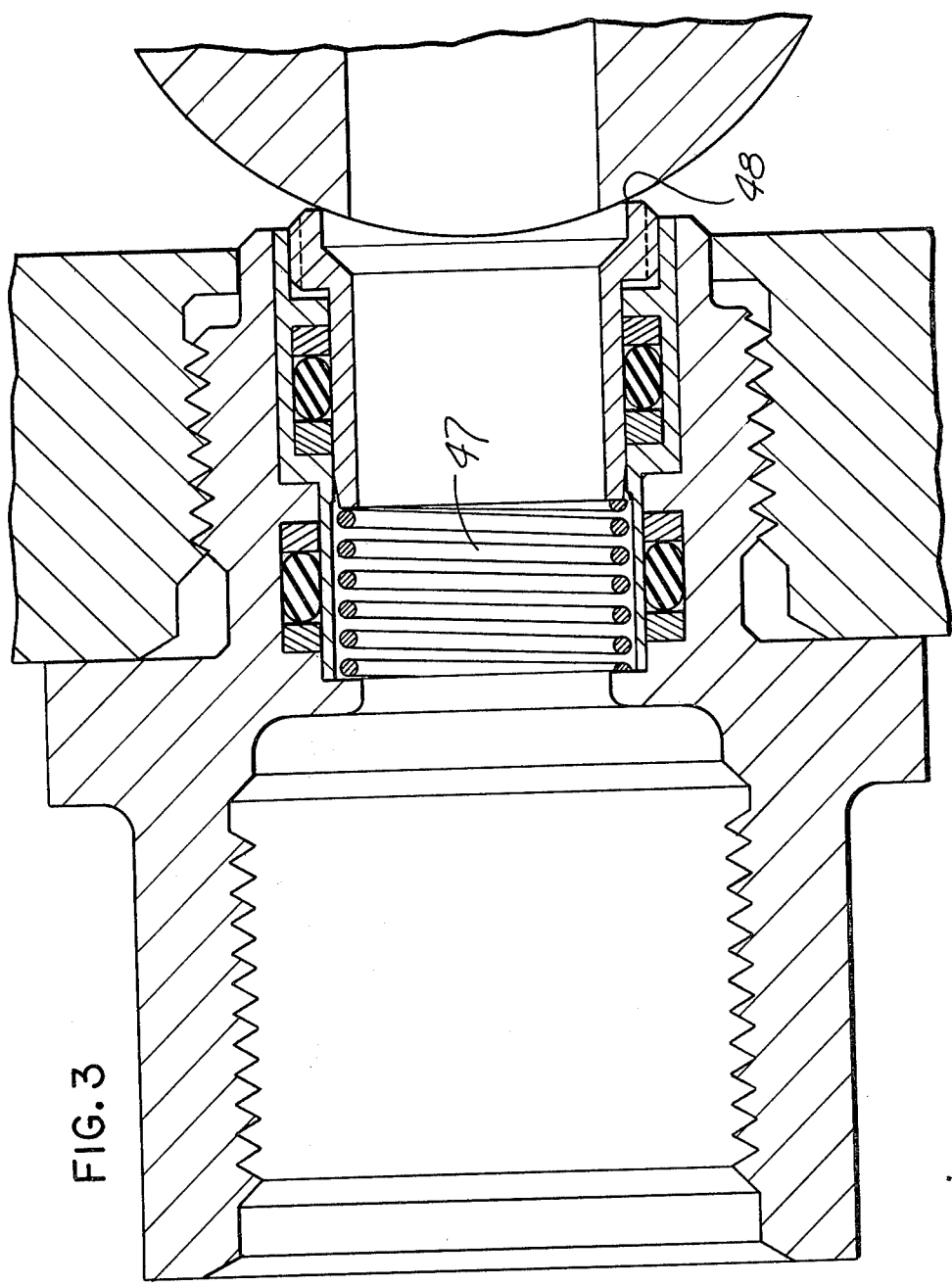

VALVE

BACKGROUND OF THE INVENTION

This invention relates to valves, and more particularly to stable aircraft valves or the like.

PRIOR ART STATEMENT

Cylinders to carry conventional ball valve seals are disclosed in the prior art. Moreover, such cylinders are conventional and are typically biased against a ball valve by a Belleville spring, a wave spring, or a coiled spring. The following U.S. patents disclose one or more or all of such structures.

| U.S. Pat. No. | ISSUED DATE |
|---|---|
| 2,698,731 | June 4, 1955 |
| 2,751,185 | January 19, 1956 |
| 3,037,738 | June 5, 1962 |
| 3,118,650 | January 21, 1964 |
| 3,266,769 | August 16, 1966 |
| 3,269,691 | August 30, 1966 |
| 3,960,363 | June 1, 1976 |

The spring frequently causes pulsations which break seals. A larger spring is needed when the valve is not self sealing.

SUMMARY OF THE INVENTION

The above-described and other disadvantages of the prior art are overcome by providing an annular seal against an axially biased ball valve cylinder, a sleeve and an annular seal on the outside of the sleeve. Stability is thereby achieved and the valve is balanced.

BRIEF DESCRIPTION OF THE DRAWINGS

In the accompanying drawings which illustrate exemplary embodiments of the present invention:

FIG. 3 is a vertical sectional view of an alternative embodiment of the present invention.

DESCRIPTION OF THE PREFERRED EMBODIMENTS

Figure 1:
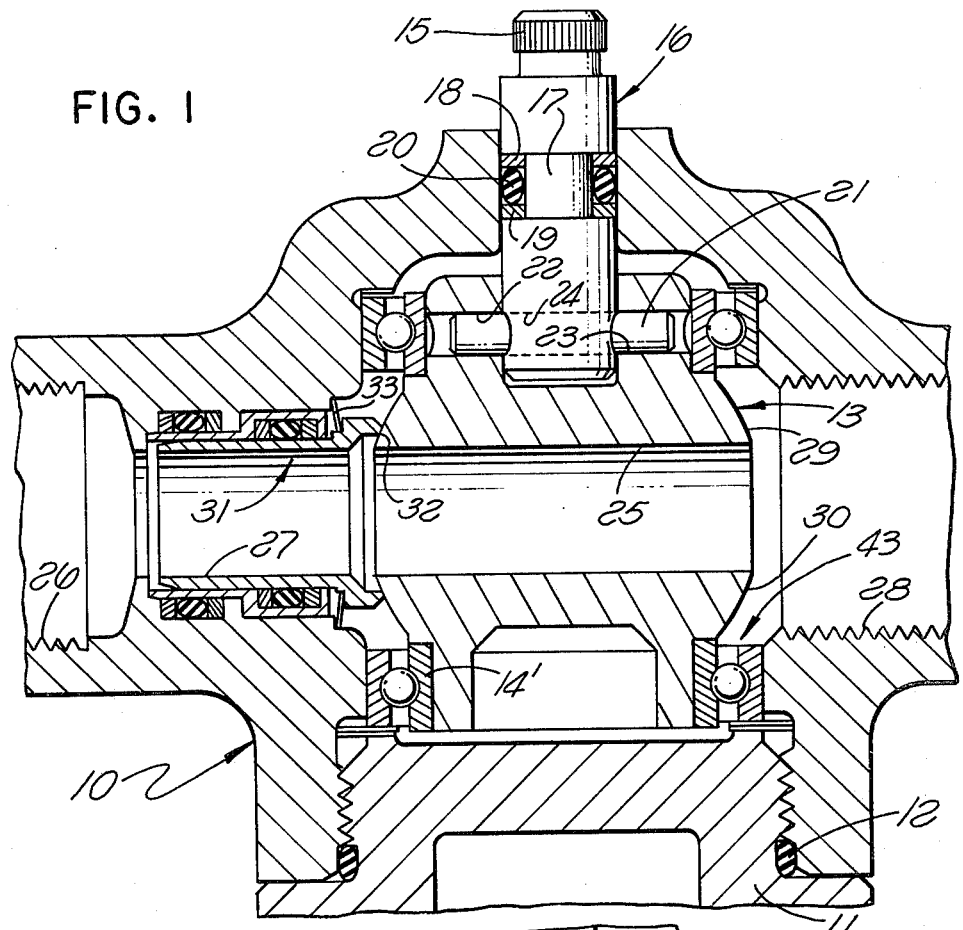
FIG. 1 is a vertical sectional view through a ball valve constructed in accordance with the present invention.

In the drawings, in FIG. 1, a body is provided at 10 having a plug 11 sealed to the body at 12.

Ball valve 13 and everything inside the inside diameter of ball bearing races 14 and 14' from knurled head 15 of shaft 16 to the bottom of ball valve 13 may be conventional.

Shaft 16 has a reduced diameter portion 17 surrounded by washers 18 and 19, and a packing 20.

A pin 21 is slidable through holes 22 and 23 in ball valve 13 and is press fit through a diametral hole 24 in shaft 16. Ball valve 13 then has a cylindrical hole 25 which is, in the position shown, concentric about the common axis of cylindrical surfaces 26, 27 and 28.

Ball valve 13 has surfaces 29 and 30 which are portions of spheres.

A cylinder 31 is provided that has a lip 32 that is biased by a rather weak Belleville spring 33 into fluid tight engagement with the spherical surface around where hole 25 opens out of ball valve 13 to the left, as viewed in FIG. 1.

Figure 2:
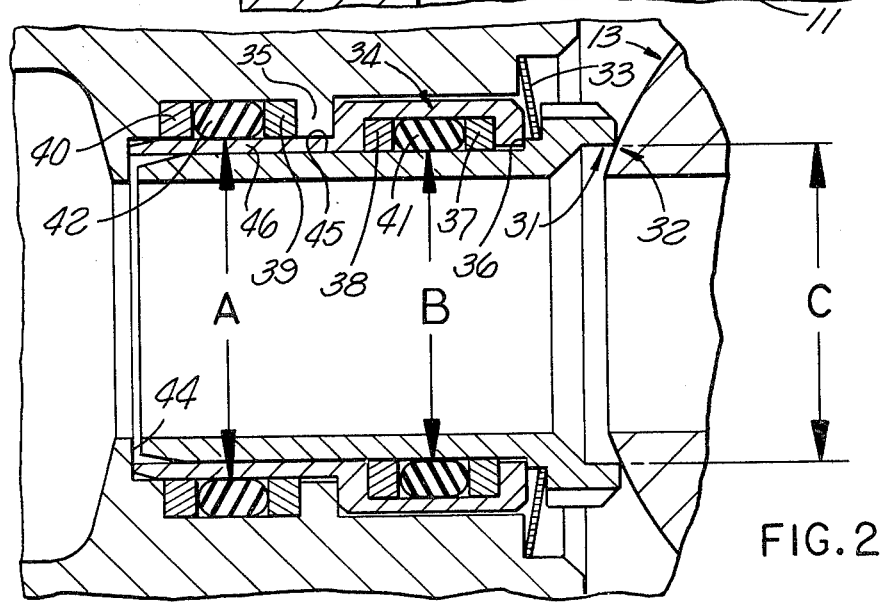
FIG. 2 is an enlarged vertical sectional view of a portion of the vave turned 90 degrees.

Movement of cylinder 31, as viewed in FIG. 2, is limited where a sleeve 34 abuts a rib 35 integral with body 10, and a shoulder 36 on cylinder 31.

Washers 37, 38, 39 and 40 are provided in FIG. 2. There are also provided O-rings 41 and 42, both in compression.

Body 10 is fluid tight. Surfaces 26 and 28 define first and second aligned openings, respectively, concentric about a single first axis. Body 10 defines a chamber 43 between the openings. Ball valve 13 may be described as being rotatably mounted about a second (vertical) axis concentric with that of shaft 16 in FIG. 1. The second axis is normal to the first axis.

The axis of hole 25 may be described as a third axis rotatable with ball valve 13 to the position shown in FIG. 1. The third axis is thus normal to the second axis.

Note that body 10 has an inwardly extending radial lip 44 (FIG. 2).

Lip 32 has a sharp annular edge in engagement with said ball valve 13. Lip 32 is formed between internal and external surfaces, the internal lip surface having a diameter C as shown in FIG. 2. Cylinder 31 has a main outside cylindrical surface 45 having a diameter B. Sleeve 34 has a cylindrical portion 46 having an outside diameter A. Spring means (33 in FIGS. 1 and 2 and 47 in FIG. 3) apply a force to lips 32 and 48, respectively.

The present invention reduces valve pulsations, improves stability, and effectively balances the valve or causes it to self seal. The conditions for self sealing with flow in either direction, zero flow and pressures from zero to or exceeding 3000 psi, for example, are $A > C$ and $C > B$.

What is claimed is:

1. A valve comprising: a fluid tight housing having first and second aligned openings concentric about a first axis, and means defining a chamber between said openings; a ball valve rotatably mounted about a second axis in said chamber normal to said first axis, said ball valve having a cylindrical hole therethrough with a third axis rotatable therewith to a postion in alignment with said first axis and normal to said second axis; a cylinder having an annular lip with a sharp edge with an inside diameter, said cylinder having a main external cylindrical surface smaller than said lip inside diameter, said housing having seal means to guide axial movement of said cylinder toward and away from said ball valve coaxial with said first axis; and spring means to urge said lip, at said inside diameter thereof, into fluid tight contact with said ball valve around said hole therethrough, said seal means including a sleeve around said cylinder and having an internal first groove adjacent said lip; a first annular seal in said internal first groove in compression in between said sleeve and said cylinder, said seal means having a cylindrical portion contiguous to said housing, said housing forming an annular second groove with said cylindrical portion; and a second annular seal in compression in said second groove between said cylindrical portion and said housing, said housing having a bore to receive said cyinder and including spring biasing means between said bore and said cylinder to bias said sharp edge into compression against said ball valve, wherein said ball valve has a spherical surface in engagment with said annular lip sharp edge, said lip being formed between internal and external surfaces, said annular lip sharp edge having a diameter C, said cylinder main outside cylindrical surface having a diameter B, said seal means cylindrical portion having an outside diameter A, A being larger than C, C being larger than B to thereby cause self sealing with flow in either direction and in a zero flow condition.

* * * * *